UNITED STATES PATENT OFFICE.

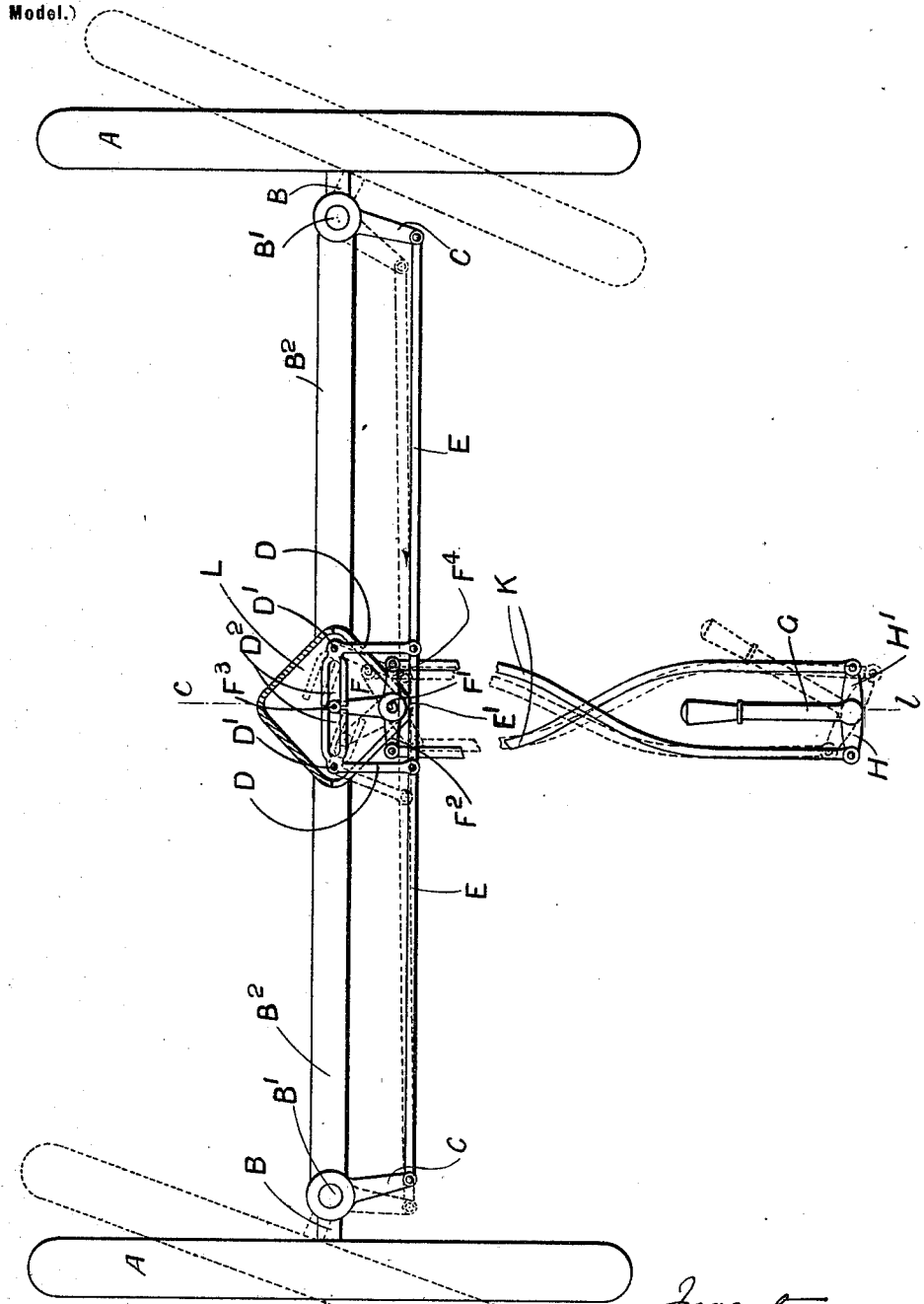

HERBERT G. OGDEN, JR., OF WASHINGTON, DISTRICT OF COLUMBIA, ADMINISTRATOR OF HERBERT CHURCHILL CAPEL, DECEASED.

STEERING-GEAR.

SPECIFICATION forming part of Letters Patent No. 669,654, dated March 12, 1901.

Application filed December 15, 1900. Serial No. 39,984. (No model.)

*To all whom it may concern:*

Be it known that HERBERT CHURCHILL CAPEL, deceased, late a subject of the Queen of England, residing at London, England, did during his lifetime invent certain new and useful Improvements in Steering-Gear, of which the following is a specification.

This invention relates to steering-gear specially advantageous for use on motor-cars steered by two leading wheels or in any other situation in which, as in the case of a steam-launch with twin rudders, the steering is effected by twin steering-spindles or rudder-heads.

According to this invention the rotatable steering-spindles are mounted in a suitable support and coupled by an operative connection, by which they will be caused to rotate in the same sense. An arm on each steering-spindle extends toward the companion arm on the other steering-spindle, and an operating-arm controlled directly by hand or mechanically is pivoted in that support and specially disposed, so as to be in operative engagement with both the steering-spindle arms aforesaid when it is in its mean position, but with only one or the other when moved out of that mean position. By moving the operating-arm out of its mean position it moves one or other of the steering-spindle arms in the desired direction; but so long as it remains in the mean position the steering-spindle arms cannot react upon the operating-lever so as to tend to move it, for the steering-spindle arms, being coupled in the manner described, move in opposite directions and cannot do so until the operating-arm is moved by the operator so as to engage only one of them.

The accompanying drawing is a plan of the front wheels of a vehicle to which steering-gear constructed according to this invention is applied.

The wheels A, which are the wheels by which the steering of the vehicle is effected, are provided with short axles B, each of which is pivoted to turn about a vertical axis. The pivots of these axles are at the ends B' of the axletree B². Rigidly secured to the axles B are tiller-rods C, which may make an obtuse angle therewith in order to obtain differential steering in a manner well understood. About midway between the steering-wheels A two bell-crank levers D D² are secured on steering-spindles D' within a casing L, secured to the axletree. The axes of the spindles are vertical, so that the levers turn in the horizontal plane. The steering-spindle arm D² of each of the bell-crank levers D D² is forked, as shown, and the levers are so arranged that when the steering-wheels A are in planes parallel with the longitudinal center line c l of the vehicle the two forks D² will be in line, each with its opening presented to the opening of the companion fork. The arms D are connected to the tiller-rods C by connecting-rods E, and they are also joined together by a coupling-rod E'. A three-armed operating-lever, constituted by three radial arms F F² F⁴, is pivoted within the casing L at F', adjacent to the bell-crank levers D D². It turns about a vertical axis, and one arm F² of the lever extends forward to the forks D² and is provided with a projection F³, engaging with these forks. Preferably a roller is placed on the projection F³ in order to reduce friction between the projection and the forks. The other two arms F² F⁴ of the lever F are arranged at right angles to the arm F². At a convenient part of the vehicle a lever or steering-handle G is arranged, operatively connected to the center of a two-armed lever H H'. The arms H H' of this lever are connected to the two arms F² F⁴ of the three-armed lever F F² F⁴ by cross-links K.

On turning the steering-handle G out of the position in which it is shown by full lines into that in which it is shown in dotted lines the arm F of the three-armed lever F F² F⁴ will be turned in the position in which it is shown by dotted lines, thus causing the left-hand bell-crank lever D D² to assume the position shown in dotted lines. Upon this movement of the left-hand bell-crank lever the two wheels A and the right-hand bell-crank lever will be moved by means of the connecting-link E, E', and E², the relative positions into which these parts are thus moved being shown in dotted lines. Similarly on turning the steering-handle G in the opposite direction the wheels A will be operated to turn in the reverse direction from which they are shown in dotted lines. With steering-gear constructed according to this invention it will be seen that by the employment of the crossed connecting-links K the leading end of the vehicle will move in the direction in which the steering-handle G is moved.

When the wheels are positioned so that the vehicle will run in a straight line, the forks $D^2$, as already stated, will form substantially a continuous slot, and when in this position the projection $F^3$ of the arm F will be just within the extremities of both forks $D^2$. With the projection in this position the steering is locked, so that the wheels cannot be caused to deviate from a straight line by contact with stones or the like, for no motion of the wheels about their steering-pivots $D'$ can occur unless the forks $D^2$ move in opposite directions, and this they are prevented from doing as long as the projection $F^3$ engages both simultaneously. Owing to the movement of the projection $F^2$ in the forks $D^2$ the leverage the operator can act with against the resistance of the gear lessens as the handle G moves toward either extreme of its lateral adjustment, and consequently the relative speed of movement of the different parts varies with the position of the handle G. If only slight deviations from the straight path are required, a comparatively large amount of movement of the steering-lever is required to effect the small amount of lateral movement of the steering-wheels. When, however, a curve is being taken and the steering-handle moved well to one side or the other, the lateral movement of the wheels increases relatively to the movement of the steering-lever, the smaller the curve taken.

What is claimed as the invention, and desired to be secured by Letters Patent, is—

1. In a steering-gear the combination with a support of rotatable steering-spindles mounted in it, an operative connection coupling them, an arm on each steering-spindle extending toward the companion arm on the other steering-spindle and an operating-lever pivoted to the support and so disposed as to be in operative engagement with both the steering-spindle arms in a mean position but with only one or the other when moved out of that mean position.

2. In a steering-gear the combination with a support of rotatable steering-spindles mounted in it an arm extending from each steering-spindle in the same direction, a coupling-rod connecting the outer ends of those arms, an arm on each steering-spindle extending toward the companion arm on the other steering-spindle, and an operating-lever pivoted to the support and so disposed as to be in sliding engagement with both the steering-spindle arms in a mean position, but with only one or the other when moved out of that mean position.

In testimony whereof I have signed my name to this specification in the presence of two subscribing witnesses.

HERBERT G. OGDEN, JR.,
*Administrator of the estate of Herbert Churchill Capel, deceased.*
Witnesses:
W. CLARENCE DUVALL,
H. M. GILLMAN, Jr.